H. B. LESTER.
AUTOMATIC SCREW MACHINE.
APPLICATION FILED JAN. 28, 1907.

939,604.

Patented Nov. 9, 1909.
11 SHEETS—SHEET 1.

Fig.1.

WITNESSES:

INVENTOR:
Harry B. Lester
PER
Harry P. William
ATTORNEY.

H. B. LESTER.
AUTOMATIC SCREW MACHINE.
APPLICATION FILED JAN. 28, 1907.

939,604.

Patented Nov. 9, 1909.
11 SHEETS—SHEET 7.

WITNESSES:
S. S. Grotta.
Lena C. Berry.

INVENTOR:
Harry B. Lester
PER
Harry P. Williams
ATTORNEY.

H. B. LESTER.
AUTOMATIC SCREW MACHINE.
APPLICATION FILED JAN. 28, 1907.

939,604.

Patented Nov. 9, 1909.
11 SHEETS—SHEET 8.

WITNESSES:
S. S. Grotta.
Lena C. Berry.

INVENTOR:
Harry B. Lester
PER
Harry R. Williams
ATTORNEY.

H. B. LESTER.
AUTOMATIC SCREW MACHINE.
APPLICATION FILED JAN. 28, 1907.

939,604.

Patented Nov. 9, 1909.
11 SHEETS—SHEET 10.

WITNESSES:
S. S. Grotta.
Lena C. Berry.

INVENTOR:
Harry B. Lester
PER
Harry P. Williams
ATTORNEY.

H. B. LESTER.
AUTOMATIC SCREW MACHINE.
APPLICATION FILED JAN. 28, 1907.

939,604.

Patented Nov. 9, 1909.
11 SHEETS—SHEET 11.

FIG.15.

WITNESSES:
S. S. Grotta.
Lena C. Berry.

INVENTOR:
Harry B. Lester
PER
Harry R. Williams
ATTORNEY.

UNITED STATES PATENT OFFICE.

HARRY B. LESTER, OF HARTFORD, CONNECTICUT, ASSIGNOR TO THE DAVIS SEWING MACHINE COMPANY, OF DAYTON, OHIO, A CORPORATION OF OHIO.

AUTOMATIC SCREW-MACHINE.

939,604. Specification of Letters Patent. Patented Nov. 9, 1909.

Application filed January 28, 1907. Serial No. 354,497.

*To all whom it may concern:*

Be it known that I, HARRY B. LESTER, a citizen of the United States, residing at Hartford, in the county of Hartford and State of Connecticut, have invented a new and useful Automatic Screw-Machine, of which the following is a specification.

This invention relates to an automatic screw machine of the multiple tubular-spindle rod-feed type.

The object of the invention is to produce a simple, compact machine of wide scope and high efficiency having tubular spindles that are always rotated in the same direction for causing the stock to be operated upon by the tools, which spindles can be retained at their respective stations and caused to feed the stock collectively to the same or different tools for producing the same or different cuts on the several rods, or the spindles can be given intermittent revolutionary movements whereby the stock may be successively presented to a less number, the same number or a larger number of tools than there are spindles, for producing progressive cuts of the desired character upon the several rods.

The machine which is illustrated is so designed that three rods of stock may be fed collectively, each to its own tool and no other, which tools may be the same or of a different character, and which at each revolution produce the same cut on each rod, or the machine can be operated so that three rods of stock held by the three spindles may be successively presented to three different tools or to six different tools for producing three or six different or successive cuts upon each rod, whereby a large number of simple pieces or a smaller number of complicated pieces, that is, pieces having a variety of cuts, may be rapidly produced, on a machine which is comparatively cheap to build, which can be adjusted and operated easily by an ordinary mechanic, which performs its operations accurately, and which will operate with little power and not readily get out of adjustment and repair.

In the machine illustrated there are three stock spindles with rod feeds and chucks and there are three transversely movable cutting tools and means for using six axially movable tools, two of the latter being shown as threading tools. It is to be understood however that the invention is not limited to the exact number of spindles shown, and also that the number of tools would be increased or diminished correspondingly with the number of spindles the machine has.

Figure 1:
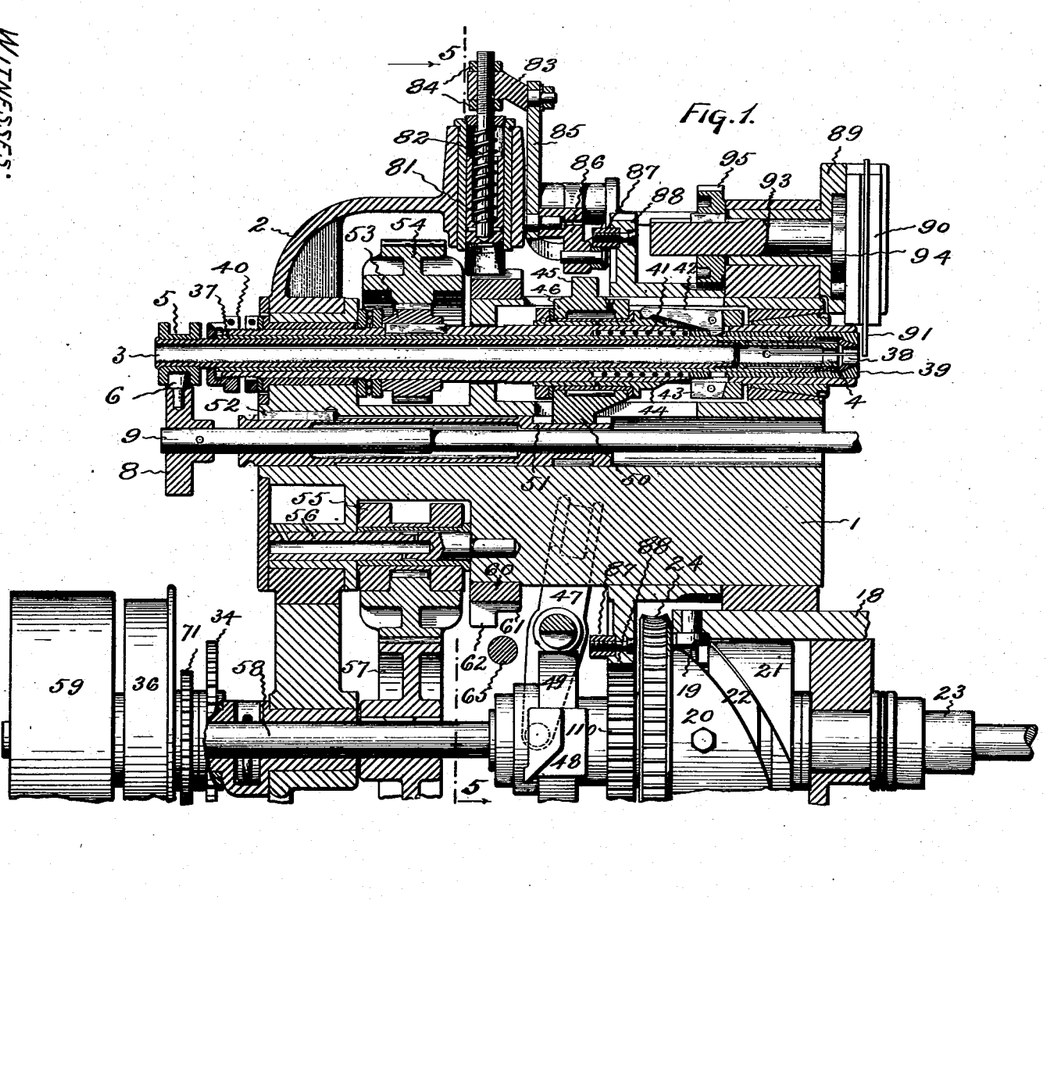
Figure 1 of the accompanying drawings shows a central vertical section of the spindle head end of the machine.
Figure 3:
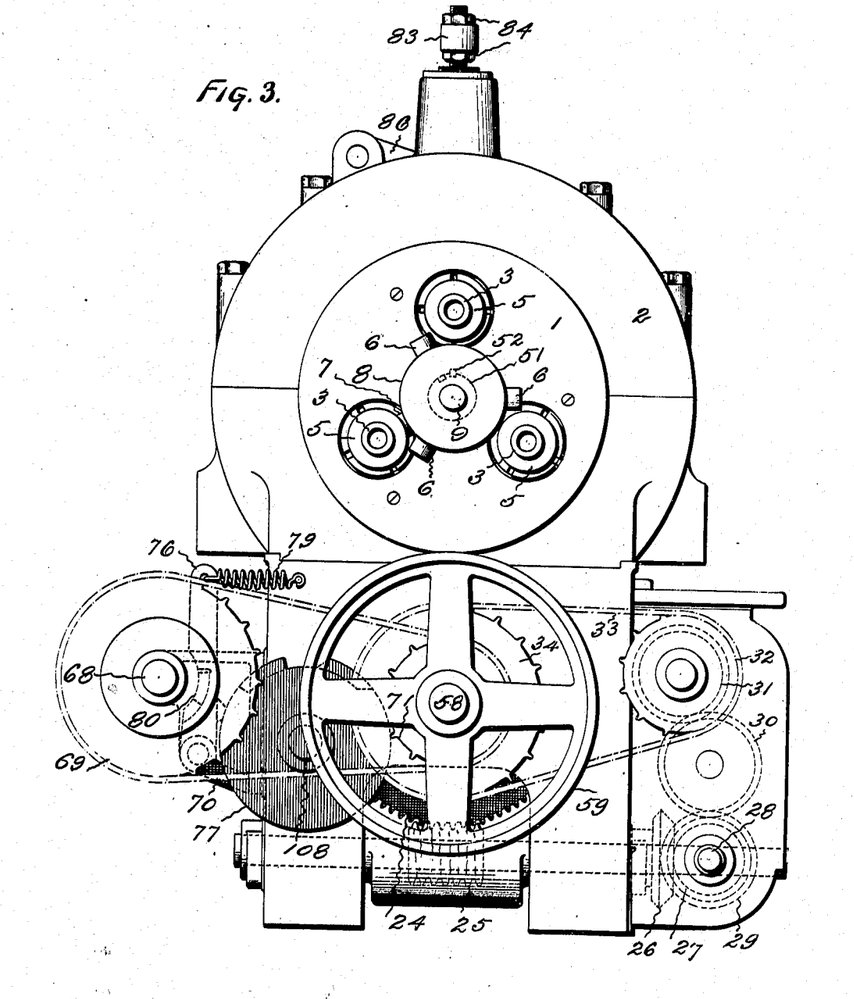
Fig. 3 shows an elevation of the left hand end of the machine.
Figure 12:
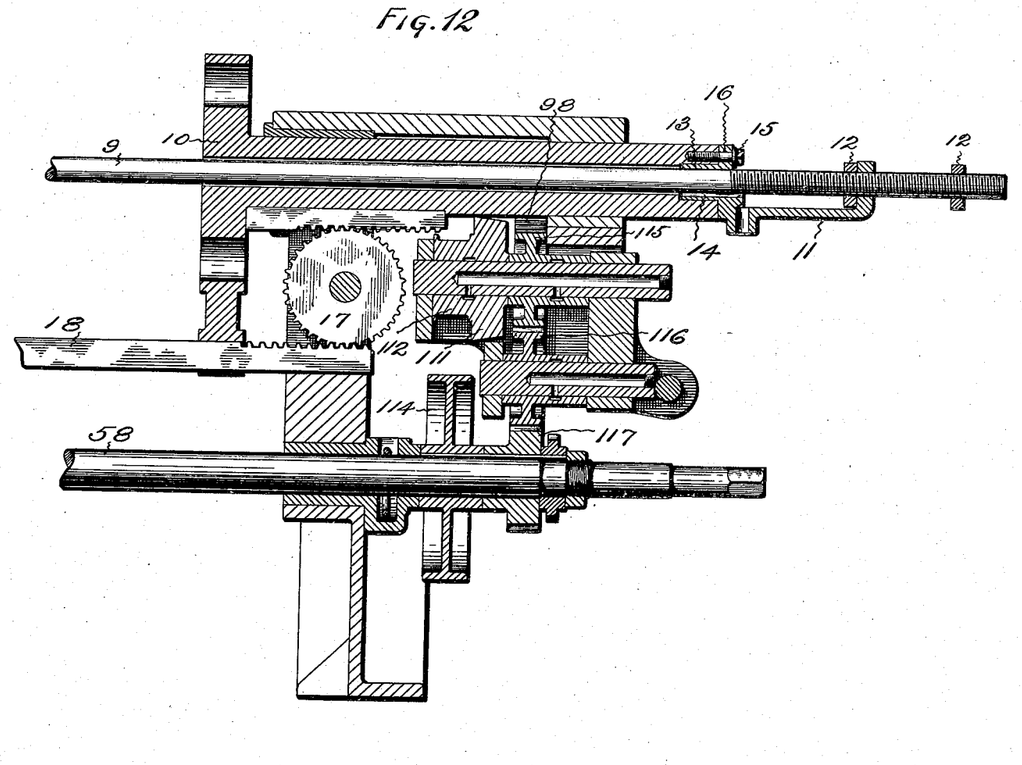
Fig. 12 shows a central longitudinal section of the tool head and adjacent mechanism.

The spindle head 1 is rotatably supported at its ends by bearings in the frame 2. Each spindle has a feed tube 3 with a split gripping collet 4 at one end and a grooved collar 5 at the other end. The feed tubes are drawn back and fed forward at the proper time by the engagement with the grooved collars of either the three rolls 6 or the single roll 7 according to the adjustment of the disk 8 on which the rolls are mounted and which is fastened to a shaft 9 that extends through the center of the spindle head and also through the center of the box tool head 10. (Figs. 1, 3, 12.) If the disk is so turned that the three rolls engage with the collars on the ends of the three feed tubes all of the feed tubes are reciprocated simultaneously but if the disk is so turned that only one roll engages with a collar (as shown in Fig. 3) but one feed tube will be reciprocated with each reciprocation of the tool head.

Figure 15:
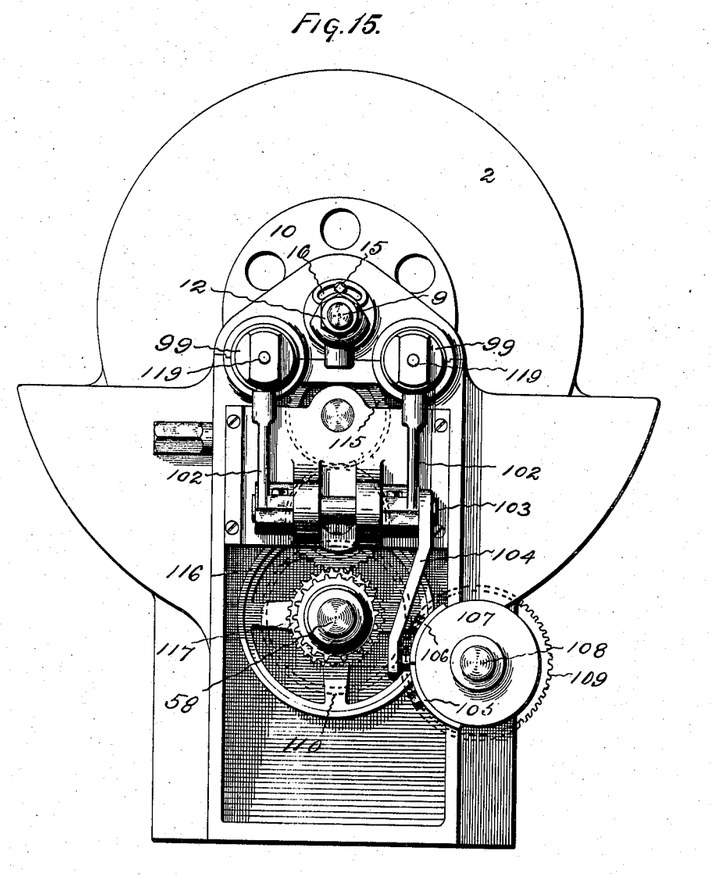
Fig. 15 shows an elevation of the right hand end of the machine.

The feed tube reciprocating shaft is connected with the tool head by means of the arm 11 and the nuts 12 which are threaded on the end of the shaft. This arm has a hub 13 that extends into the end of the tool head and in this hub is a spline 14 that enters the shaft so that the shaft will be turned when the arm is turned. The arm is held in position by a screw 15 which passes through a slot 16 in the face of the hub and into the end of the tool head. When this screw is loose the arm may be turned so as to turn the shaft and disk for causing either the single roll to successively engage with the collars on the ends of the feed tubes or causing the three rolls to engage with the three collars on the ends of the feed tubes, or the arm, shaft and disk may be so turned that all the rolls are disengaged allowing the feed tubes to be drawn out of the spindles. When the screw is tightened the arm and the connected parts are held from turning. As the tool head is moved back and forth arm moves the shaft and reciprocates the feed tubes a distance depending upon the adjustment of the nuts on the shaft (Figs. 12, 15).

Figure 2:
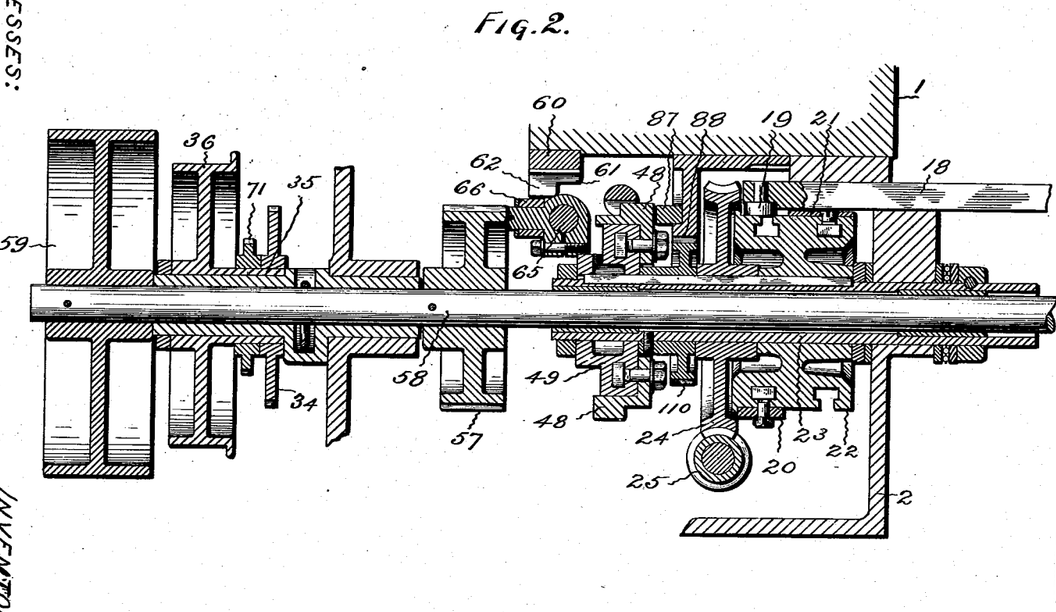
Fig. 2 shows a central vertical section of the driving mechanism at the spindle head end of the machine.

The hub of the tool holder has a rack meshing with which is a gear 17 that meshes with a rack on the end of a bar 18 which extends backwardly to the head end of the machine where it is supported by a part of the frame (Figs. 1, 12). This bar has a roll 19 which is engaged by the cams 20 and 21 adjustably fastened on the surface of a cam cylinder 22, which is keyed to a sleeve 23. This sleeve is supported by the frame and is provided with a worm wheel 24 that is engaged by a worm 25. (Figs. 1, 2). On the worm shaft is a bevel gear 26 that meshes with a bevel gear 27 on a shaft 28 that extends longitudinally along the front of the machine and has a gear 29 that engages with a gear 30 which meshes with a gear 31 on a shaft bearing sprocket wheel 32 that is connected by a chain 33 with a sprocket wheel 34 that is attached to the hub 35 of the driving pulley 36. (Figs. 2, 3).

Figures 5, 16:
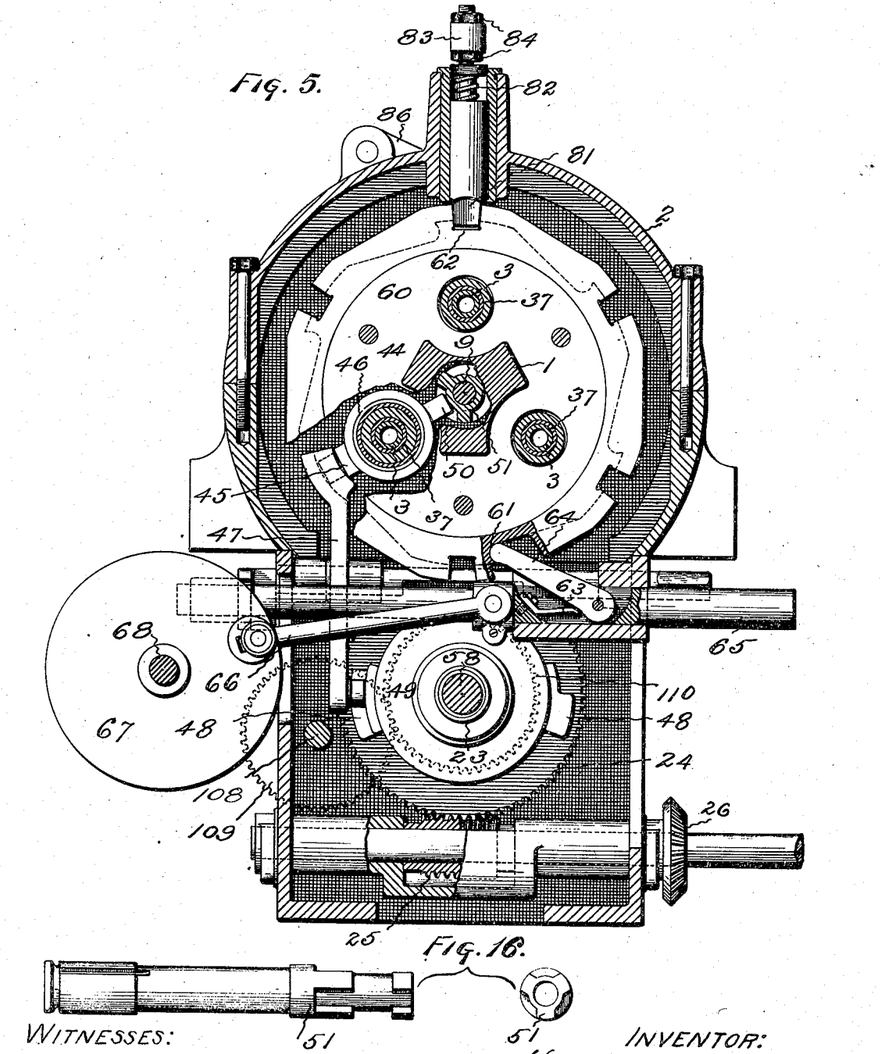
Fig. 5 shows a vertical section of the spindle head taken on the plane indicated by the dotted line 5 5 on Fig. 1.
Fig. 16 shows a side and an end view of the means employed for causing the chucks to operate simultaneously.

Inside of each spindle, but outside of the feed tube, is a chuck tube 37 at the forward end of which is a spring jaw chuck 38. The position of the chuck with relation to the chuck closing sleeve 39 is determined by the adjustment of the nut 40 threaded upon the rear end of the spindle (Fig. 1). The chuck closing sleeve is normally thrust forward by the spring 41 and is drawn backward for closing the chuck jaws by levers 42 that are pivoted on the collar 43 mounted on the spindle and that are spread by the conical wedge 44. (Fig. 1). The wedge is moved backwardly and forwardly at the proper time by the engagement of a lug 45 projecting from the collar 46 on the wedge sleeve, with a lever 47 that is pivoted to the frame and that is oscillated by cams 48 adjustably fastened to the cylinder 49 which is keyed upon the sleeve 23 that is rotated by the worm wheel 24. (Figs. 1, 2, 5).

If the roll disk 8 is turned to the position shown in Fig. 3 so that the feed tubes are moved one at a time when the spindles reach the proper station during their revolutions with the head, the chucks are opened and closed one at a time, but if the roll disk is turned so that the three feed tubes are reciprocated simultaneously the chucks will be opened and closed simultaneously. The inner edge 50 of each chuck wedge collar 46 extends into a groove in a sleeve 51 that is movable on the shaft 9. The groove has portions of its walls cut away so that when the sleeve is in one position the collar which is moved by the lever for causing the chucking cone to act will move without engaging the sleeve. The outer end of this sleeve is arranged so that it may be grasped and is provided with a removable key 52 to prevent accidental movement. When the key is removed the sleeve may be turned to such a position that the walls of the groove will engage the inner edges of all of the chuck wedge collars so that when one collar is moved by the lever all of the collars will be moved. (Figs. 1, 5, 16).

Keyed upon each spindle is a pinion 53 and encircling the spindles and having interior teeth meshing with the pinion teeth is a gear 54 which also has exterior teeth. In the head between the spindles grooved pulleys 55 are arranged upon arbors 56 for supporting the gear. Meshing with the exterior teeth of the gear that surrounds the spindles is a pinion 57 that is keyed to a shaft 58 which is driven by the driving pulley 59 (Figs. 1, 2). The rotation of this driving pulley causes the encircling gear to rotate the spindles at all times uniformly and in the same direction regardless of their position about the axis of the head.

Fastened about the spindle head is a ring 60 which on one side of its periphery has ratchet teeth 61 and on the other side has index notches 62. Held by a spring 63 so as to engage with the ratchet teeth is a pawl 64. This pawl is mounted in a traverse slide 65 that is connected by the link 66 with a crank disk 67 on a longitudinal extending shaft 68 (Fig. 5). Turning loosely on this latter shaft is a sprocket wheel 69 which is connected by the chain 70 with a sprocket wheel 71 that is attached to the hub of the driving pulley 36 (Figs. 2, 3).

Figures 6, 7, 8, 9:
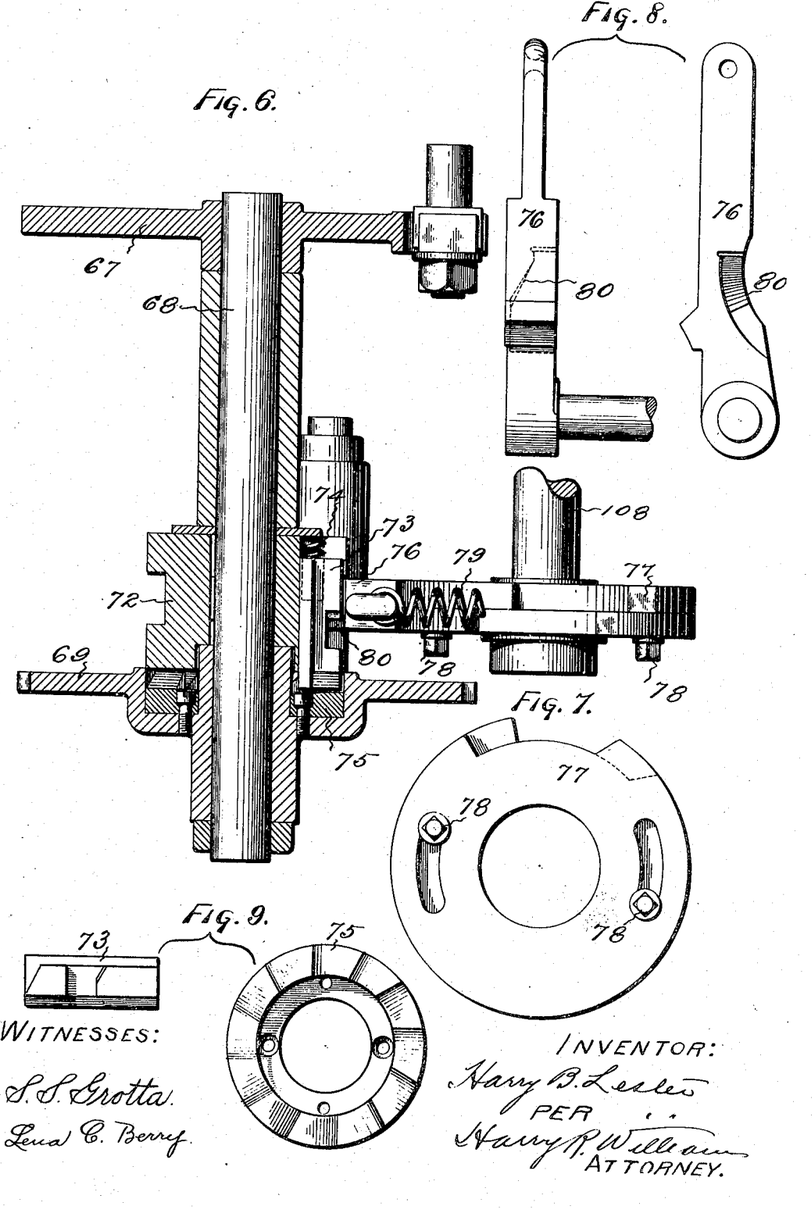
Fig. 6 shows a sectional plan of the mechanism by means of which the spindle head is given three or six intermittent rotatory movements during each revolution.
Fig. 7 shows a face view of the adjustable cam by means of which this variation in feed is accomplished.
Fig. 8 shows side and edge views of the lever which coöperates with the adjustable cam.
Fig. 9 shows the ratchet and pawl which is actuated by the cam and lever for connecting the driving sprocket with the crank shaft that effects the rotation of the spindle head.

On the crank shaft and keyed thereto is a block 72 which carries a sliding pawl 73 that is normally thrust by a spring 74 toward the teeth of a ratchet wheel 75 secured in the hub of the sprocket 69. (Fig. 6). When the sliding pawl engages the ratchet teeth the loose sprocket and crank shaft are so connected that the revolution of the driving pulley causes the index pawl to give the spindle head an intermittent rotatory movement. The sliding pawl that connects the crank shaft with the ratchet wheel in the sprocket is withdrawn and held back at the proper time so that the head will remain stationary, by the lever 76 which is pivoted to the frame and is pushed forwardly so as to engage the pawl by the cam disks 77 on the shaft 108 which has a gear 109 that engages with the gear 110 on the sleeve 23 that is rotated by the worm wheel 24. (Figs. 3, 5, 6, 7, 8, 9).

Each of the cam disks has a portion of its periphery cut away and they are held together by bolts 78 which when loosened permits the disks to be adjusted so as to vary the length of the peripheral opening. (Fig. 7). When the opening in the periphery in the disks is back of the lever, the lever is drawn back by a spring 79 so as to release the pawl and allow it to engage the ratchet and connect the sprocket and crank shaft. The time that the pawl is allowed to stay in contact with the ratchet teeth depends on the length of the opening in the periphery of the cam. When the cam turns so that the lever is pushed forward the pawl, as the block 72 rotates with the crank shaft, engages the cam 80 on the lever and is forced back from the ratchet so as to disconnect the sprocket and the crank shaft. If the opening in the periphery of the cam resulting from the adjustment of the disks is short the lever is drawn back only a sufficient length of time for the crank to make one revolution and to advance the spindle head one step, which is in the form of machine shown, one-sixth of a revolution. If the opening in the periphery of the cam is long the lever stands retracted a sufficient length of time for the crank to make two revolutions, in which case the pawl makes two reciprocations and advances the spindle head two steps, or in the case illustrated one-third of a revolution, so that by adjusting the disks which make up this cam which is used to effect the connection of the driving sprocket and crank shaft, the head may at will be given an intermittent rotation of either one-third or one-sixth of a revolution.

Figures 10, 11:
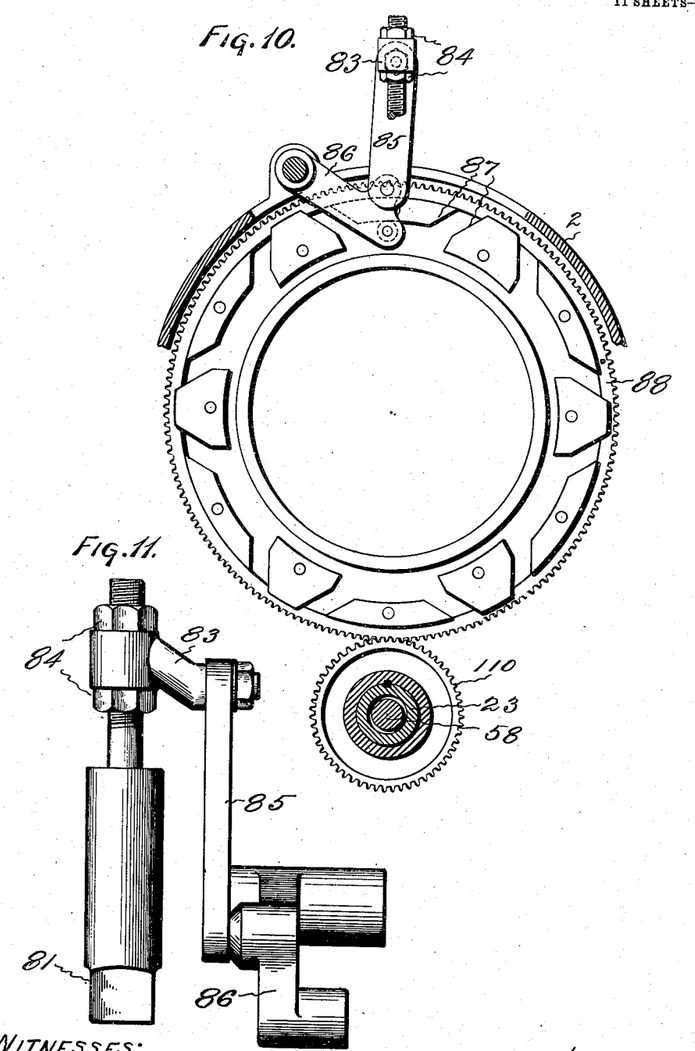
Fig. 10 shows a face view of a portion of the spindle head indexing mechanism.
Fig. 11 shows a side elevation of the index bolt and the connection by means of which it is operated by the cam.

Engaging the index notches in the periphery of the index ring on the spindle head is the end of an indexing bolt 81. This bolt is normally pressed down by a spring 82 and is lifted at the proper time and held lifted a sufficient length of time to permit the head to be advanced, by the arm 83 which is adjustably secured to the bolt by means of the nuts 84 (Fig. 1). The arm is connected by the link 85 with a lever 86 that is pivoted to the frame of the machine and has a roll that is adapted to be engaged by the cam blocks 87 that are removably secured to the face of the gear 88 which is mounted upon the head and is driven by the gear 110 keyed to the sleeve 23 that is driven by the worm wheel 24 (Figs. 1, 10, 11).

Figures 4, 19:
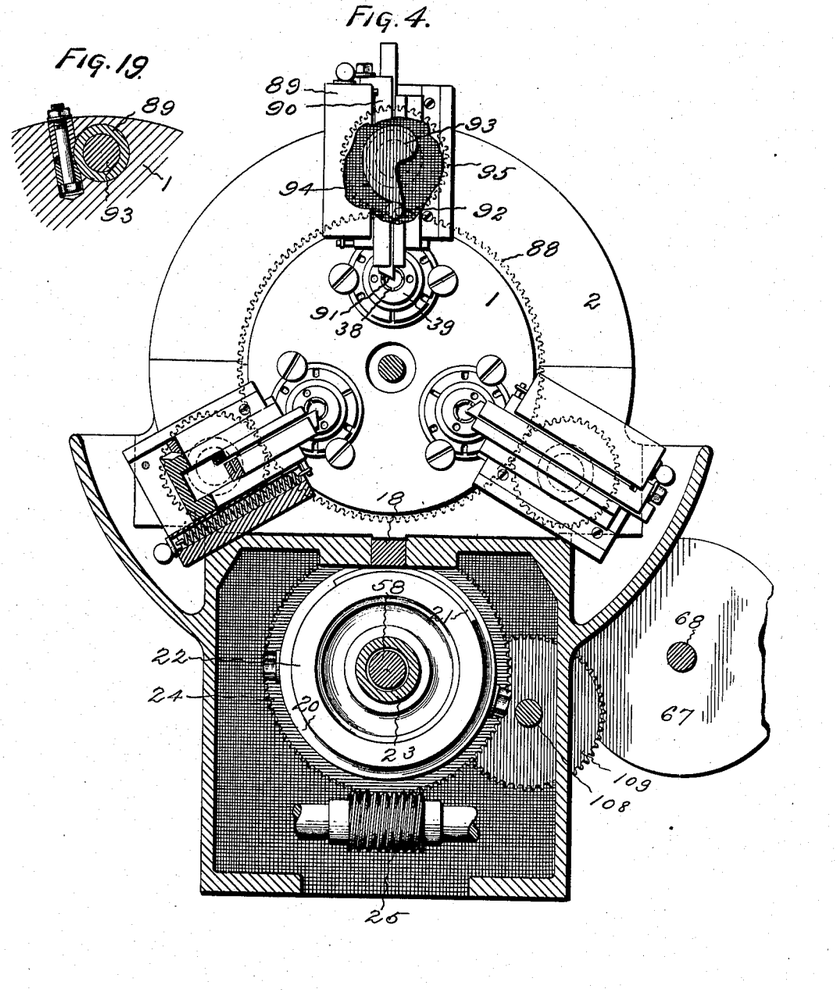
Fig. 4 shows an elevation of the right hand end of the spindle head of the machine.
Fig. 19 shows the manner of holding a radial tool holder.

On the face of the frame are tool boxes 89. The hubs of these boxes are adjustably fastened in place so that the distance of the tools carried by the boxes from the face of the head may be varied (Figs. 1, 4, 19).

In each tool box is a tool holder 90 that is arranged to be moved radially toward and from an adjacent spindle. Each tool holder carries a cutting tool 91. Projecting inwardly from each tool holder is a stud 92 and extending through the hub of each box is a shaft 93 provided on its forward end with a cam 94 that is arranged to engage the stud for the purpose of feeding the tool holder and tool toward the spindle. A spring is arranged to draw the tool holder outwardly and hold the stud in engagement with the surface of the cam (Figs. 1, 4).

Splined on the shaft of each tool cam is a pinion 95. These pinions engage with gear teeth cut in the periphery of the hub of the gear 88 that surrounds the head. (Fig. 1). By means of this mechanism the radially moving tools are caused to move forward and from the stock carried by the spindles mounted in the head.

As previously stated the box tools or those tools which are fixed in the longitudinally moving tool head 10 are reciprocated toward and from the work at the proper time by a gear and the rack bar which is reciprocated by the cams on the cam cylinder that is driven by the worm which also drives the pinion that engages the gear which has the teeth in its hub that cause the radially moving tools to be actuated.

Extending through the tool head but not movable therewith are a pair of threading spindles 96. These are loosely held by the frame that supports the tool head. These spindles may carry taps or dies or one may carry a tap and the other a die, according to the work which it is desired to accomplish. (Figs. 13, 14).

On each threading spindle and fastened thereto is a bevel friction pulley 97 and loose on each spindle is a pinion 98. The pinion has a rotation on the spindle but no longitudinal movement, being held by the frame, while the friction pulley rotates the spindle and also moves longitudinally with it. (Fig. 13.)

On the outer end of each tool spindle and movably fastened thereto is a frame 99 with a groove 100. In these grooves are rolls 101 on the upper ends of arms 102 that extend from a shaft 103 mounted in the frame and having an arm 104 with a roll 105 on its lower end that is adapted to be engaged by the cams 106 on the cam disks 107 that are fastened to the shaft 108 which extends longitudinally of the machine. The rotation of this shaft with these cams oscillates the arms in such manner as to push the spindles forwardly and backwardly at the proper time. (Figs. 13, 15.) The shaft 108 has a gear 109 (Figs. 5, 15) which meshes with the gear 110 keyed to the sleeve 23 which is driven by the worm wheel 24.

Figure 13:
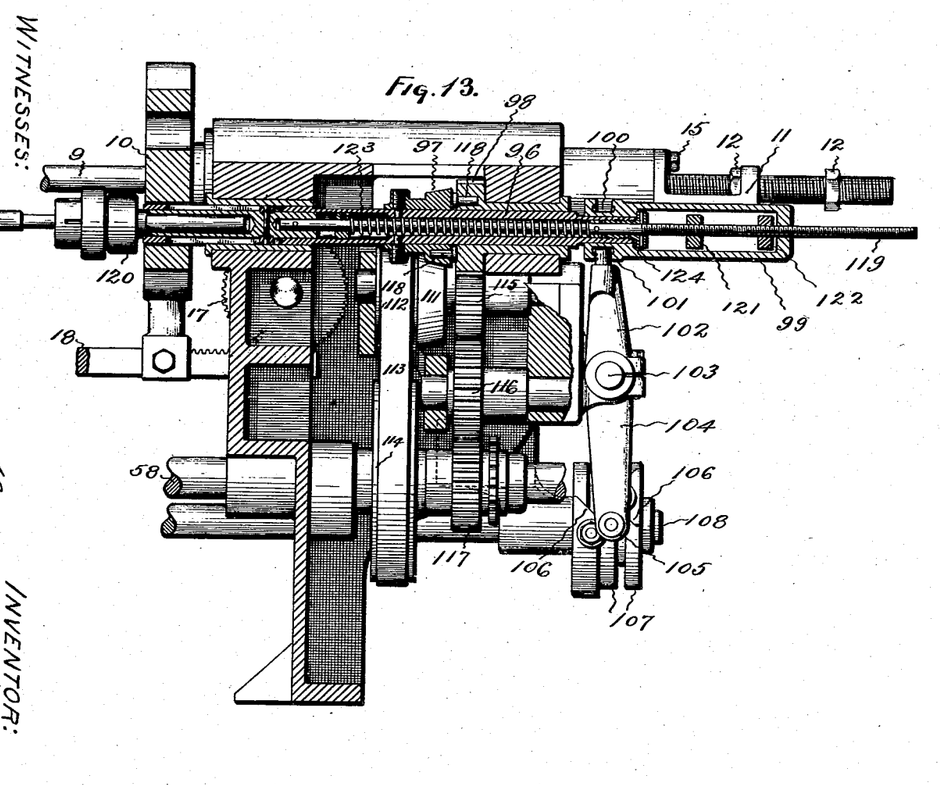
Fig. 13 shows a longitudinal section of the tool head and the mechanism for actuating one of the threading tool spindles.
Figures 14, 17, 18:
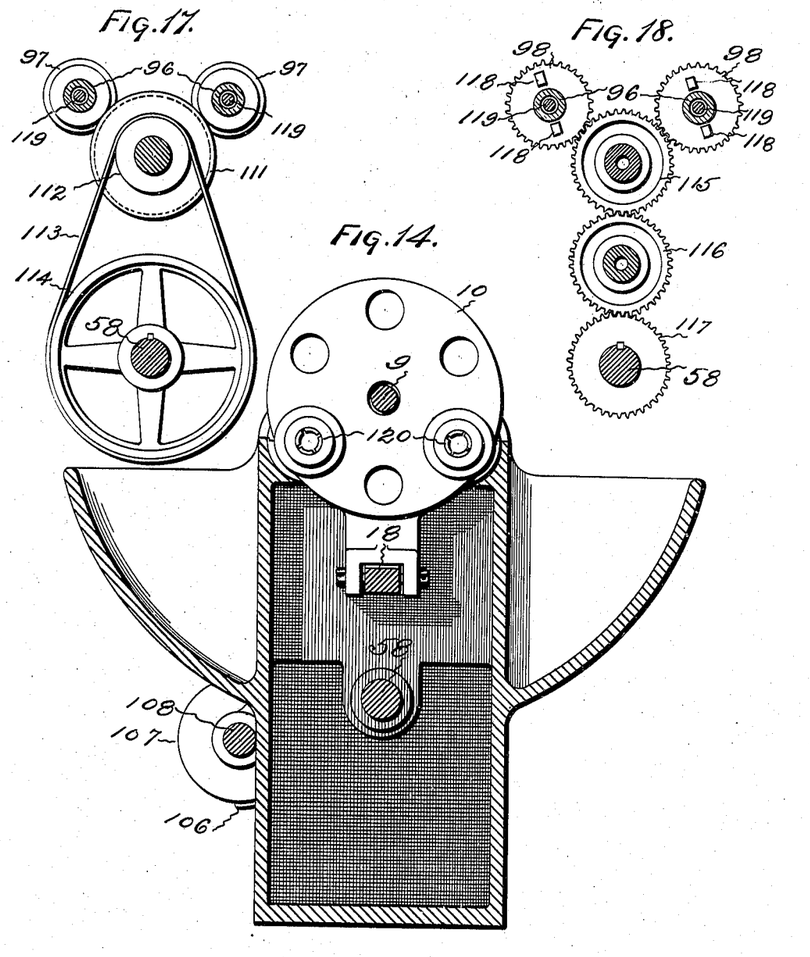
Fig. 14 shows an elevation looking toward the tool head from the left.
Fig. 17 shows a diagram of the rapid friction drive for the threading spindles.
Fig. 18 shows a diagram of the positive slow drive for the threading spindle.

Beneath the bevel friction pulleys on the threading tool spindles, is a coöperating friction pulley 111 formed on the hub of a belt pulley 112 which is by the belt 113 driven from the pulley 114 keyed to the shaft 58 which is driven by the pulley 59 (Figs. 12, 13, 17).

Meshing with the pinions 98 on the threading tool spindles is a gear 115 that is engaged by the gear 116 which meshes with the gear 117 on the shaft 58 (Figs. 12, 13, 18).

On the face of the gear that turns loosely on the spindle and on the face of the adjacent friction pulley are clutch pins 118. When the spindle is forward the clutch pins are disengaged and the friction pulley on the spindle is in contact with and is rotated by the friction driving means at high speed, in fact faster than the rotation of the stock spindles so that the threading tool will be unscrewed from the thread which it has cut on the stock. When the spindle is back and the friction pulleys are disengaged, the clutch pins will be engaged so that the spindle will be driven in the same direction positively by the gears, but very much slower, in fact slower than the stock spindles so that the threading tool will cut a thread on the rotating stock (Fig. 13).

The outer end of the stem 119 of each threading tool holder 120 is threaded and bears nuts 121, 122. A spring 123 arranged to thrust against a collar on the stem, and a collar in the threading spindle, tends to hold back the stem with relation to the threading spindle and withdraw the spindle when the tool is free from the hole threaded. (Fig. 13.)

The frames 99 have a slight longitudinal movement on the spindles, the amount of this movement being determined by the adjustment of the threaded bushings 124 which holds the frames on the spindles. The cams are so timed that the levers through the frames first start the threading tools onto the stock with a positive push after which the tools follow the threads which they cut. When the threads have been cut, the nuts 121 on the stems of the tool holders engage the frame and the further advancement of the tools, as the thread is cut, causes the spindles to be moved forwardly so that the clutch pins are disengaged, releasing the gear driving mechanism. The friction pulleys are then carried into engagement with the friction drive which rotates the spindles so much faster than the stock that the tools unscrew from the threads which they have cut. When the tools are unscrewed the requisite distance the nuts 122 engage the frames and draw the spindles backward so that the friction pulleys are disengaged from the friction drive and the clutch pins engaged so the spindle will again be driven by the gears.

As above mentioned when the friction pulleys are engaged the threading tool spindles are rotated much faster than the stock spindles so that the tools will be unscrewed from the stock, but when the gears are connected the threading tool spindles are rotated slower than the stock spindles so that a thread will be cut on the stock. The levers which engage the frames attached to the spindles are so actuated by the cams that they start the threading tools onto the stock positively and withdraw the threading tools from the stock after they have been unscrewed, and they also hold the friction pulleys in engagement at the proper time.

In the machine illustrated three rods of stock can be intermittently fed to the tools. When the feeding and chucking mechanisms are adjusted in one manner the three rods of stock will be unclamped, fed forward and clamped simultaneously so that each rod will be acted upon by its own tool, which tools may be similar or dissimilar in character. If the clutching and feed mechanisms are adjusted in another manner, the three rods of stock are released, fed and clamped successively so that each rod will be presented progressively to all of the tools which are required to produce the desired cuts. If the head rotating mechanism and indexing mechanism is in one adjustment the ratchet moves the spindle head one-sixth of a revolution each time the index disk is unlocked so that stock held by these spindles may be presented to six end tools. If the head rotating mechanism is in its other adjustment the ratchet makes two movements and moves the head one-third of a revolution each time the index bolt is raised, and this presents each piece of stock carried by the three different spindles to three end tools.

With the construction illustrated and described these adjustments can be made by any ordinary mechanic without danger of injuring the machine.

The invention claimed is:—

1. A screw machine having a rotatable head, mechanism for imparting rotatory movement to the head, gearing driven continuously from the driving shaft, mechanism for connecting and disconnecting the head rotating mechanism with said gearing, means controlling the action of the connecting and disconnecting mechanism, gearing driven continuously from the driving shaft, and a cam continuously rotated by said latter gearing and actuating the controlling means for different periods whereby the number of stops of the head during each revolution may be varied, substantially as specified.

2. A screw machine having a spindle head, mechanism for imparting rotatory movement to the head, gearing driven continuously from the driving shaft, mechanism for connecting and disconnecting the head rotating mechanism and said gearing, means controlling the action of the connecting and disconnecting mechanism, gearing driven continuously from the driving shaft, a cam rotated continuously by said latter gearing and actuating the controlling means for different periods whereby the distance of the rotatory movement of the head may be increased or diminished, spindles carried by the head and mechanism for rotating the spindles, substantially as specified.

3. A screw machine having a spindle head mechanism for imparting intermittent rotatory movement to the head, stock spindles carried by the head, mechanism for rotating the spindles continuously in the same direction, means for feeding a rod longitudinally through each spindle when the head is idle, means for clamping a rod in each spindle, mechanism for operating the feeding means and the clamping means in conjunction with the head rotating mechanism, a larger number of end tool holders than there are stock spindles, and means for adjusting the head rotating mechanism whereby the head may be stopped so as to present each spindle with its feed and clamp in line with every tool holder or only part of the tool holders, substantially as specified.

4. A screw machine having a spindle head, mechanism for imparting rotatory movement to the head, gearing driven continuously from the driving shaft, mechanism for connecting and disconnecting the head rotating mechanism and said gearing, means controlling the action of the connecting and disconnecting mechanism, gearing driven continuously from the driving shaft, a cam rotated continuously by said latter gearing, said cam being adjustable so that it may act for a longer or shorter period on the controlling means, and tool holders movable axially of the spindles, substantially as specified.

5. A screw machine having a rotatable spindle head, spindles carried by the head, mechanism for rotating the spindles, adjustable mechanism for rotating the head a greater or less amount, and a greater number of axially moving tool holders than there are spindles, substantially as specified.

6. A screw machine having a spindle head, mechanism for imparting rotatory movement to the head, gearing driven continuously from the driving shaft, mechanism for connecting and disconnecting the head rotating mechanism and said gearing, means controlling the action of the connecting and disconnecting mechanism, gearing driven continuously from the driving shaft, means for actuating the controlling means for different periods, spindles carried by the head, mechanism for rotating the spindles continuously in one direction, means for feeding a rod longitudinally through each spindle when the head is idle, means for clamping a rod in each spindle, mechanism for operating the feeding and clamping means in conjunction with the head rotating means, and means connecting the feed operating mechanism with either one or all of the feeding means, and the clamping mechanism with either one or all of the clamping means, substantially as specified.

7. A screw machine having a rotatable head, spindles carried by the head, means for feeding a rod through each spindle, means for clamping a rod in each spindle, means for imparting an intermittent rotatory movement to the head, adjustable means for indexing and locking the head, tools movable radially of the spindles and means surrounding the head and arranged to operate the index lock and also the radially movable tools, substantially as specified.

8. A screw machine having a spindle head, mechanism for imparting a rotatory movement to the head, spindles carried by the head, mechanism for rotating the spindles, means for feeding a rod through each spindle, means for clamping a rod in each spindle, mechanism for operating the feeding means, mechanism for operating the clamping means, a tool holder movable axially of the spindles toward and from the spindle head, and mechanism adjustably connected to and movable with said tool holder and movably constructed and arranged so as to be capable of connecting either one or all of the feeding means with the feed operating mechanism, substantially as specified.

9. A screw machine having a spindle head, a ratchet continuously rotated by the driving mechanism, a pawl for imparting a rotatory movement to the head, a crank for reciprocating the pawl, means for connecting the continuously rotated ratchet with said crank, and an adjustable cam controlling the period of action of the connecting means between the crank mechanism and the continuously rotated ratchet, substantially as specified.

10. In a screw machine, a spindle head rotating mechanism having a ratchet and pawl for imparting a rotatory movement to the head, a crank for reciprocating the pawl, a continuously driven clutch member mounted adjacent to and adapted to rotate the crank, a clutch member arranged to connect and disconnect the former clutch member and the crank, a lever for actuating the latter clutch member, and a continuously rotated adjustable cam adapted according to its adjustment to cause the lever to co-act with the latter clutch member for different periods of time and cause the ratchet and pawl to rotate the head for variable intervals, substantially as specified.

11. A screw machine having a rotatable spindle head, rotatory spindles carried by the head, means for feeding rods through spindles, means for clamping rods in the spindles, a pinion mounted on each spindle, rollers mounted in the head intermediate of the spindles, an internal and external gear surrounding the head and mounted on the rollers and having its interior teeth in engagement with the teeth of the pinions on the spindles, and a pinion meshing with the external teeth of the annular gear, substantially as specified.

12. A screw machine having a rotatable spindle head, a tool spindle movable parallel with the axis of the head, a cam and a lever engaging and adapted to move said spindle longitudinally, means for rotating the tool spindle, a threading tool holder supported by and movable with, but having a limited movement independently of the tool spindle, said tool holder having an extended stem, and means adjustably connected with the stem of the threading tool holder and adapted to engage and move the spindle longitudinally in opposite directions at predetermined intervals, substantially as specified.

13. A screw machine having a rotatable spindle head, rotatable spindles carried by the head, a tool spindle movable axially of the head, positive gearing adapted to be connected with the spindle for rotating it at one speed, friction gearing adapted to be connected with the spindle for rotating it at a higher speed, mechanism for reciprocating the spindle, a threading tool holder carried by the spindle, and means adjustable on the stem of the threading tool holder for moving the spindle and causing the engagement of the friction gearing and the disengagement of the positive gearing or the disengagement of the friction gearing and the engagement of the positive gearing, substantially as specified.

14. A screw machine having a rotatable head, mechanism for imparting rotatory movement to the head, gearing driven continuously from the driving shaft, mechanism for connecting and disconnecting the head rotating mechanism with said gearing, and an adjustable cam rotated continuously from the driving shaft and actuating said controlling means for different periods whereby the distance of rotatory movement of the head may be increased or diminished, substantially as specified.

15. A screw machine having a rotatable spindle head, rotatory spindles carried by the head, mechanism for imparting a rotatory movement to the head, mechanism for rotating the spindles, a larger number of tools than spindles movable axially toward and from the spindles, and means for presenting and stopping the spindles before all of the tools or only part of the tools, substantially as specified.

HARRY B. LESTER.

Witnesses:
G. H. GORNDA,
W. W. CUNNINGHAM.